(12) United States Patent
Kudva et al.

(10) Patent No.: US 10,224,813 B2
(45) Date of Patent: Mar. 5, 2019

(54) VARIABLE FREQUENCY SOFT-SWITCHING CONTROL OF A BUCK CONVERTER

(71) Applicant: NVIDIA Corporation, Santa Clara, CA (US)

(72) Inventors: Sudhir Shrikantha Kudva, Durham, NC (US); William J. Dally, Los Altos Hills, CA (US); Thomas Hastings Greer, III, Chapel Hill, NC (US); Carl Thomas Gray, Apex, NC (US)

(73) Assignee: NVIDIA Corporation, Santa Clara, CA (US)

( * ) Notice: Subject to any disclaimer, the term of this patent is extended or adjusted under 35 U.S.C. 154(b) by 337 days.

(21) Appl. No.: 15/080,461

(22) Filed: Mar. 24, 2016

(65) Prior Publication Data

US 2017/0279355 A1  Sep. 28, 2017

(51) Int. Cl.
 *H02M 3/157* (2006.01)
 *H02M 3/158* (2006.01)
 *H02M 1/08* (2006.01)
 *H02M 1/00* (2006.01)

(52) U.S. Cl.
 CPC ............. *H02M 3/158* (2013.01); *H02M 1/08* (2013.01); *H02M 3/157* (2013.01); *H02M 2001/0009* (2013.01)

(58) Field of Classification Search
 CPC . H02M 2001/0003; H02M 2001/0009; H02M 2001/0025; H02M 2001/0058; H02M 2001/385; H02M 3/156; H02M 3/157; H02M 3/158; H02M 1/32; H02M 1/38
 See application file for complete search history.

(56) References Cited

U.S. PATENT DOCUMENTS

| | | | |
|---|---|---|---|
| 3,660,753 A | 5/1972 | Judd et al. | |
| 5,889,392 A | 3/1999 | Moore et al. | |
| 6,614,208 B2 | 9/2003 | Narita | |
| 7,235,955 B2 | 6/2007 | Solie et al. | |
| 7,479,772 B2 | 1/2009 | Zane et al. | |
| 7,495,423 B1 | 2/2009 | Knight et al. | |
| 7,779,281 B1 | 8/2010 | Brumett, Jr. et al. | |
| 8,237,421 B1 | 8/2012 | Shahani | |
| 8,278,895 B2 | 10/2012 | Gardner et al. | |
| 8,482,271 B2 | 7/2013 | Prodic et al. | |

(Continued)

OTHER PUBLICATIONS

Final Office Action from U.S. Appl. No. 13/868,975, dated Sep. 23, 2016.

(Continued)

*Primary Examiner* — Timothy J. Dole
*Assistant Examiner* — Shahzeb K Ahmad
(74) *Attorney, Agent, or Firm* — Zilka-Kotab, PC

(57) ABSTRACT

A system and method are provided for controlling a modified buck converter circuit. A pull-up switching mechanism that is coupled to an upstream terminal of an inductor within a modified buck converter circuit is enabled. A load current at the output of the modified buck regulator circuit is measured. A capacitor current associated with a capacitor that is coupled to a downstream terminal of the inductor is continuously sensed and the pull-up switching mechanism is disabled when the capacitor current is greater than a sum of the load current and an enabling current value.

10 Claims, 13 Drawing Sheets

(56) References Cited

U.S. PATENT DOCUMENTS

| | | | |
|---|---|---|---|
| 9,231,477 B2 | 1/2016 | Daily | |
| 2004/0027105 A1 | 2/2004 | Nakamura et al. | |
| 2004/0130307 A1 | 7/2004 | Dequina et al. | |
| 2006/0038545 A1 | 2/2006 | Rutter | |
| 2006/0152204 A1* | 7/2006 | Maksimovic | H02M 1/38 323/284 |
| 2007/0013351 A1* | 1/2007 | Naka | H02M 3/157 323/241 |
| 2007/0236197 A1 | 10/2007 | Vo | |
| 2007/0290667 A1 | 12/2007 | Nagai et al. | |
| 2008/0012540 A1 | 1/2008 | Chen | |
| 2008/0024103 A1 | 1/2008 | Komiya | |
| 2008/0238390 A1 | 10/2008 | Trivedi et al. | |
| 2008/0284401 A1 | 11/2008 | Oettinger et al. | |
| 2010/0244799 A1 | 9/2010 | Moussaoui | |
| 2010/0270989 A1* | 10/2010 | Sasaki | H02M 3/157 323/282 |
| 2011/0018512 A1 | 1/2011 | Horii | |
| 2011/0043172 A1 | 2/2011 | Dearn | |
| 2011/0089915 A1 | 4/2011 | Qiu et al. | |
| 2011/0241640 A1 | 10/2011 | Qiu et al. | |
| 2011/0291632 A1 | 12/2011 | Yu et al. | |
| 2011/0316502 A1 | 12/2011 | Tang et al. | |
| 2012/0007577 A1 | 1/2012 | Lee | |
| 2012/0056604 A1 | 3/2012 | Song et al. | |
| 2012/0068679 A1 | 3/2012 | Klein et al. | |
| 2012/0081095 A1 | 4/2012 | Kung | |
| 2012/0086418 A1 | 4/2012 | Lee et al. | |
| 2012/0119718 A1 | 5/2012 | Song | |
| 2012/0119719 A1 | 5/2012 | Teh | |
| 2012/0169310 A1* | 7/2012 | Dearborn | H02M 3/157 323/271 |
| 2012/0169314 A1 | 7/2012 | Tong et al. | |
| 2012/0176104 A1 | 7/2012 | Chen et al. | |
| 2012/0242313 A1 | 9/2012 | Ko et al. | |
| 2012/0297104 A1 | 11/2012 | Thottuvelil et al. | |
| 2013/0069611 A1 | 3/2013 | Menegoli et al. | |
| 2013/0147451 A1 | 6/2013 | Hagan | |
| 2014/0097813 A1 | 4/2014 | Daily | |
| 2014/0139198 A1* | 5/2014 | Manlove | H02M 3/156 323/282 |
| 2014/0232361 A1* | 8/2014 | Dally | G01R 27/14 323/271 |
| 2014/0312860 A1 | 10/2014 | Daily | |
| 2014/0312868 A1 | 10/2014 | Daily | |
| 2016/0241145 A1* | 8/2016 | Matsuura | H02M 3/156 |
| 2017/0126124 A1* | 5/2017 | Santoro | H02M 3/158 |
| 2017/0133927 A1* | 5/2017 | Almukhtar | H02M 3/156 |
| 2017/0237332 A1* | 8/2017 | Takahashi | H02M 1/083 323/235 |

OTHER PUBLICATIONS

Non-Final Office Action from U.S. Appl. No. 13/868,975, dated May 19, 2016.

Billings et al., "Switchmode Power Supply: Handbook," McGraw Hill, Third Edition, 2011, pp. 1.145-1.150; pp. 2.163-2.176; pp. 3.119-3.155.

Infineon, "High Current PN Half Bridge NovalithIC," Automotive Power, BTN7930 Data Sheet, Rev. 1.1, Nov. 2007, pp. 1-28.

Redl et al., "Ripple-Based Control of Switching Regulators—An Overview," IEEE Transaction on Power Electronics, vol. 24, No. 12, Dec. 2009, pp. 2669-2680.

Yousefzadeh et al., "Proximate Time-Optimal Digital Control for Synchronous Buck DC-DC Converters," EEE Transaction on Power Electronics, vol. 23, No. 4, Jul. 2008, pp. 2018-2026.

Hua, G. et al., "Soft-Switching Techniques in PWM Converters," IEEE Transactions on Industrial Electronics, vol. 42, No. 6, Dec. 1995, pp. 595-603.

Zhou, S. et al. "High Efficiency, Soft Switching DC-DC Converter With Adaptive Current-Ripple Control for Portable Applications," IEEE Transactions on Circuits and Systems—II: Express Briefs, vol. 53, No. 4, Apr. 2006, pp. 319-323.

Non-Final Office Action from U.S. Appl. No. 13/868,975, dated Dec. 31, 2014.

Non-Final Office Action from U.S. Appl. No. 13/868,969, dated Apr. 2, 2015.

Final Office Action from U.S. Appl. No. 13/868,975, dated Jun. 3, 2015.

Notice of Allowance from U.S. Appl. No. 13/868,969, dated Aug. 26, 2015.

Non-Final Office Action from U.S. Appl. No. 13/868,975, dated Sep. 16, 2015.

Nour, Y. et al., "High Frequency QSQ-ZVS Integrated Buck Converter Utilizing an Air-Core inductor", 2012 Twenty-Seventh annual IEEE Applied Power electronics conference and Exposition (APEC), 2012, pp. 1319-1323.

* cited by examiner

VARIABLE FREQUENCY SOFT-SWITCHING CONTROL OF A BUCK CONVERTER

FIELD OF THE INVENTION

The present invention relates to converter circuits, and more specifically to buck converter circuits.

BACKGROUND

Conventional devices such as microprocessors and graphics processors that are used in high-performance digital systems may have varying current demands based on the processing workload. For example, current demands may increase dramatically when a block of logic is restarted after a stall or when a new request initiates a large computation such as the generation of a new image. Conversely, current demands may decrease dramatically when a block of logic becomes idle. When the current demand increases and sufficient power is not available, the supply voltage that is provided to the device may drop below a critical voltage level, potentially causing the device to fail to function properly. When the current demand decreases and the supply voltage that is provided to the device rises above a critical voltage level, circuits within the device may fail to function properly and may even be destroyed.

A conventional switching regulator is an electric power conversion device that interfaces between a power supply and a device, providing current to the device and responding to changes in current demands to maintain a supply voltage level.

Conventional voltage regulators used for central processing units (CPUs) and graphics processing units (GPUs) convert 12 Volts to approximately 1 Volt using a "buck" converter. The switches for each phase of the buck converter are typically controlled with a fixed-frequency pulse-width-modulation (PWM) signal and the buck converter is operated in continuous-conduction mode (CCM). That is, the current that is generated in an inductor is continuous and unidirectional. While a conventional buck converter is simple to operate and requires only a few components (i.e., two switches, a filter capacitor, and an inductor), significant switching losses are incurred each time a switch coupled between the power supply and the inductor is enabled to pull the upstream side of the inductor from approximately 0V to approximately 12V.

Thus, there is a need for improving conversion of voltage levels and/or other issues associated with the prior art.

SUMMARY

A system and method are provided for controlling a modified buck converter circuit. A pull-up switching mechanism that is coupled to an upstream terminal of an inductor within a modified buck converter circuit is enabled. A load current at the output of the modified buck regulator circuit is measured. A capacitor current associated with a capacitor that is coupled to a downstream terminal of the inductor is continuously sensed and the pull-up switching mechanism is disabled when the capacitor current is greater than a sum of the load current and an enabling current value.

DETAILED DESCRIPTION

A conventional buck converter is operated to generate a unidirectional and continuous current through the inductor using "hard-switching" to enable and disable the switches coupled to the upstream side of the inductor. As previously explained, hard-switching of a pull-up switch coupled between the power supply and the inductor incurs significant switching losses when the pull-up switch is enabled (i.e., turned on) to pull the upstream side of the inductor from approximately 0V to approximately 12V. Similarly, hard-switching of a pull-down switch coupled between the inductor and ground incurs significant switching losses when the pull-down switch is enabled to pull the upstream side of the inductor from approximately 12V to approximately 0V. In contrast, "soft-switching" a modified buck regulator reduces the switching losses, as described further herein.

Figure 1A:
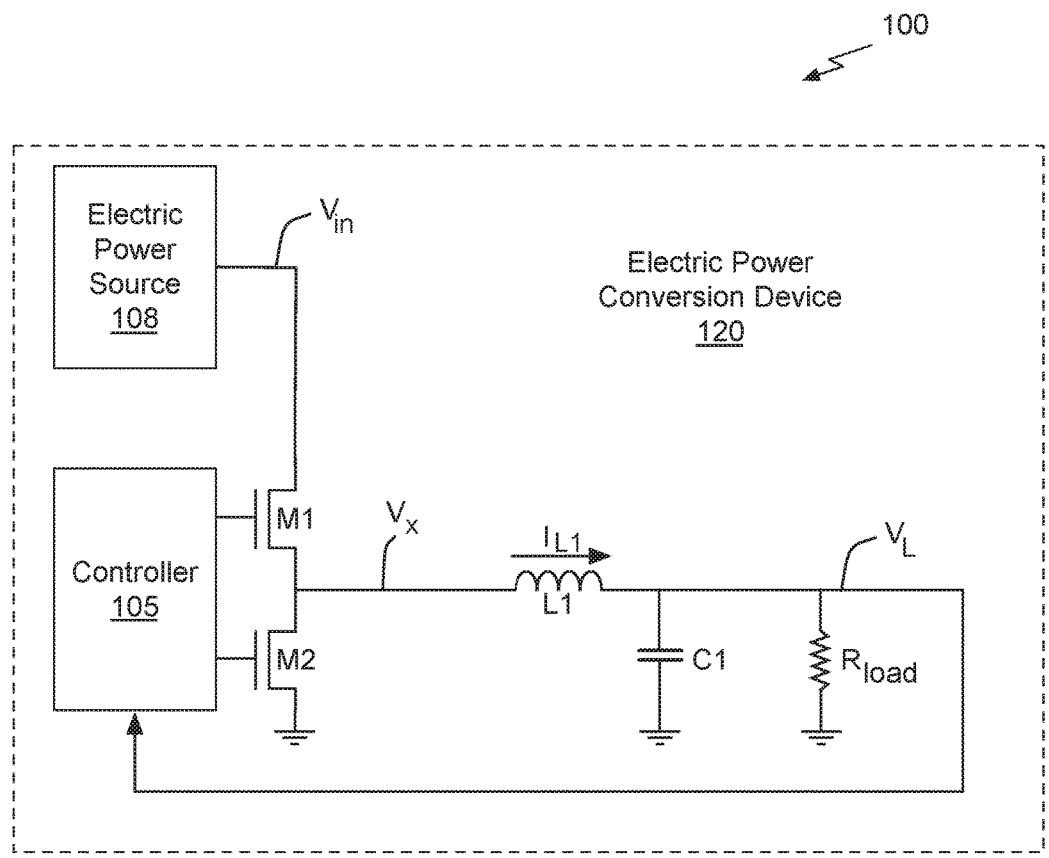
FIG. 1A illustrates a electric power conversion device that is implemented as a buck converter, in accordance with the prior art.

FIG. 1A illustrates an electric power conversion device 120 that is implemented as a buck converter, in accordance with the prior art. The electric power conversion device 120 is configured to provide a desired output voltage level ($V_L$) at the load by converting power received from an electric power source 108. The configuration of the electric power source 108, the controller 105, the switching devices M1 and M2, and the inductor L1 shown in FIG. 1A is typically referred to as a "buck" regulator (or converter). The switching mechanisms M1 and M2 may each include, for example, N-type power MOSFETs (metal oxide semiconductor field-effect transistor).

The controller 105 is operable to control the current $I_{L1}$ flowing through the inductor L1. The arrow indicates the flow of current $I_{L1}$ in the positive direction from an upstream end of the inductor L1 to a downstream end of the inductor L1. The controller 105 is configured to apply one or more control signals to the switching mechanisms M1 and M2.

In a conventional buck converter, the inductor current $I_{L1}$ follows the load current with small current ripple. The direction of the inductor current $I_{L1}$ is suitable to apply zero voltage switching (i.e., soft switching) during when the switching mechanism M2 is enabled by the controller 105. Zero voltage switching can be performed when the voltage across the switching mechanism M2 is approximately zero, meaning that the voltage at Vx is approximately at ground (e.g., 0V).

However, the switching mechanism M1 is hard switched when the switching mechanism M1 is enabled, because the voltage at Vx is not at or near a high supply voltage $V_{in}$ (e.g., 12V). Hard switching of M1 results in significant power losses. Efficiency can be improved if the switching mechanism M1 can be enabled using soft switching.

Figure 1B:
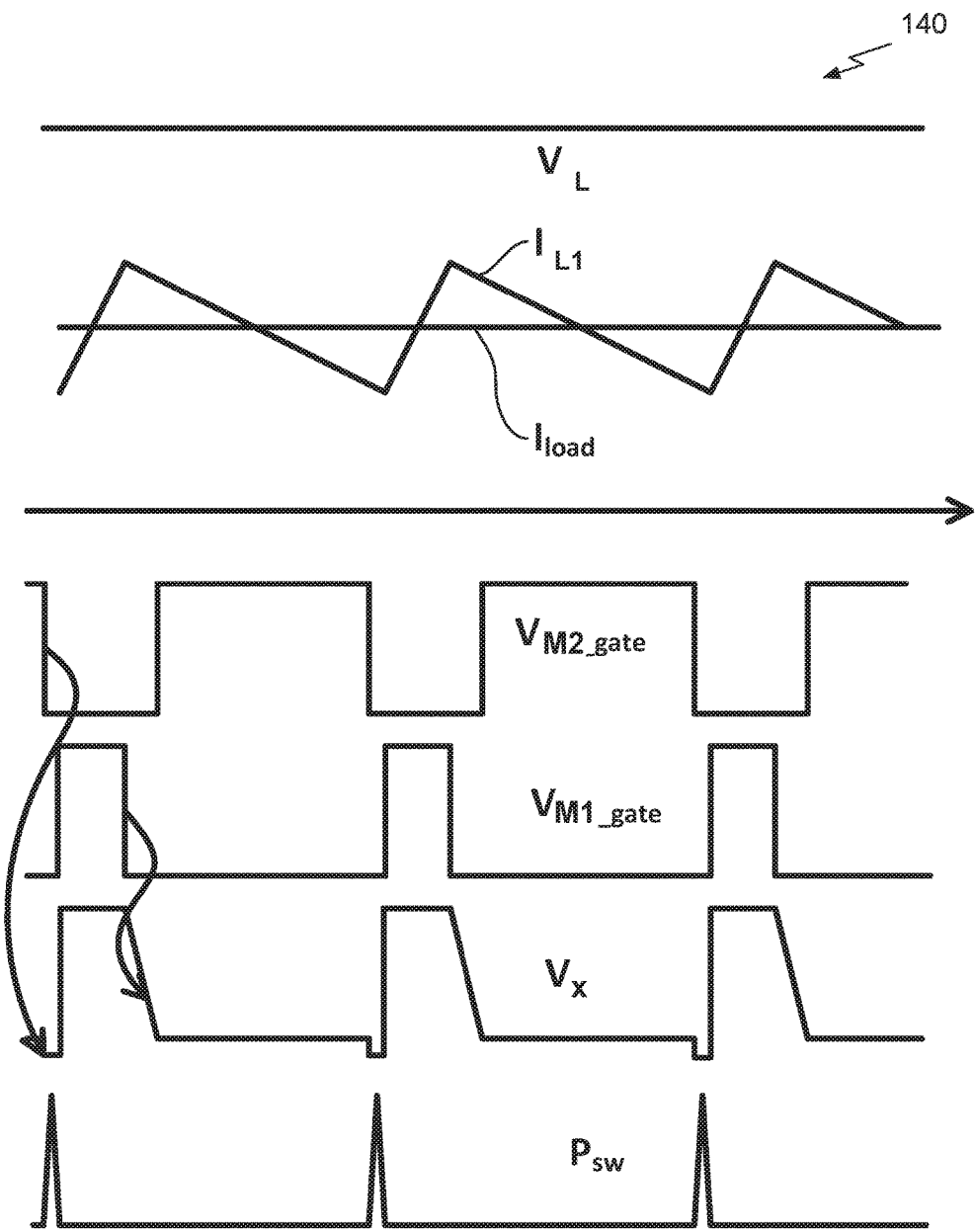
FIG. 1B illustrates voltage and current waveforms showing soft-switching of the pull-down switching device within the buck converter shown in FIG. 1A, in accordance with the prior art.

FIG. 1B illustrates voltage and current waveforms showing soft-switching of the switching mechanism M2 within the buck converter shown in FIG. 1A, in accordance with the prior art. If the inductor current ripple is small compared to the load current then the inductor current is always positive. Therefore, only the switching mechanism M2 may be enabled with zero voltage switching. As shown in FIG. 1B, to soft-switch the switching mechanism M2, the switching mechanism M1 is first disabled (i.e., turned off) and then after a certain non-overlap interval, the switching mechanism M2 is enabled. During the non-overlap interval when both the switching mechanism M1 and M2 are off, the inductor current $I_{L1}$ discharges the Vx node. A negative current is needed to apply soft-switching when the switching mechanism M1 is enabled, in order to charge the Vx node to the high supply voltage V. It is not possible to charge the Vx node to $V_{in}$ because the inductor current $I_{L1}$ is always positive, leading to switching loss ($P_{sw}$).

Soft-Switching Control of a Buck Converter

Figure 2A:
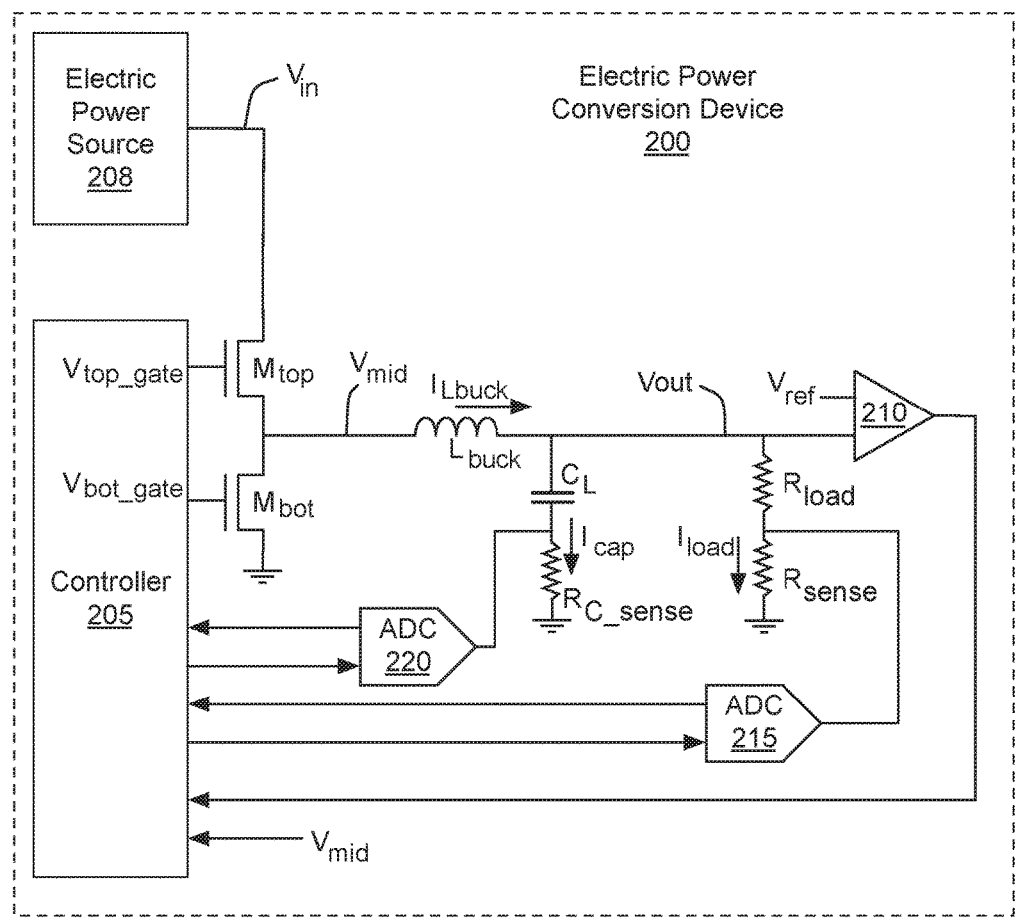
FIG. 2A illustrates a electric power conversion device that is implemented as a modified buck converter, in accordance with one embodiment.

FIG. 2A illustrates an electric power conversion device that is implemented as a modified buck converter 200, in accordance with one embodiment. The switching mechanisms $M_{top}$ and $M_{bot}$ may each include, for example, N-type power MOSFETs (metal oxide semiconductor field-effect transistor). The switching mechanisms $M_{top}$ and $M_{bot}$ may each include, for example, N-type power MOSFETs. In one embodiment, the switching mechanism $M_{top}$ is a P-type power MOSFET. Although single switching mechanisms $M_{top}$ and $M_{bot}$ are illustrated for the ease of understanding, it will be appreciated that a plurality of switching mechanisms $M_{top}$ and $M_{bot}$ may be connected in parallel to increase current capacity, decrease conduction losses, and the like. $M_{top}$ is coupled between the high supply voltage $V_{in}$ and an upstream terminal of an inductor $L_{buck}$. $M_{bot}$ is coupled between the upstream terminal of the inductor $L_{buck}$ and a low supply voltage (GND).

A controller 205 is operable to control the current $I_{Lbuck}$ flowing through the inductor $L_{buck}$. The arrow indicates the flow of current $I_{Lbuck}$ in the positive direction from an upstream end of the inductor $L_{buck}$ to a downstream end of the inductor $L_{buck}$. The controller 205 is configured to apply one or more control signals to the switching mechanisms $M_{top}$ and $M_{bot}$. As shown in FIG. 2A, a control signal $V_{top\_gate}$ is applied to the switching mechanism $M_{top}$ and a control signal $V_{bot\_gate}$ is applied to the switching mechanism $M_{bot}$.

The controller 205 may be configured to generate pulse width modulation (PWM) signals or pulse frequency modulation (PFM) signals, a combination of PWM and PFM, and/or different control signals to selectively enable the switching mechanisms $M_{top}$ and $M_{bot}$ according to a duty factor. In one embodiment, the controller 205 is configured to generate control signals to selectively enable the switching mechanisms $M_{top}$ and $M_{bot}$ to perform soft-switching. Regardless of the specific configuration, the controller 205 is configured to provide control signals such that the switching mechanisms $M_{top}$ and $M_{bot}$ are not concurrently enabled. In other words, only one of switching mechanism $M_{top}$ and $M_{bot}$ is enabled at a time. Enabling switching mechanisms $M_{top}$ and $M_{bot}$ concurrently provides a direct path between the supply of electric power source 208 and ground, thereby potentially damaging the electric power conversion device 200 and/or a load at $V_{out}$ and/or resulting in undesirable high power usage.

To apply soft-switching when the switching mechanism $M_{top}$ is enabled, the pulses turning on the switching mechanisms $M_{top}$ and $M_{bot}$ should control the non-overlap time when both switching mechanisms $M_{top}$ and $M_{bot}$ are off to produce the amount of inductor current $I_{Lbuck}$ needed to charge the $V_{mid}$ node to the high supply voltage $V_{in}$. Power losses may be minimized by limiting the inductor current ripple to a value that is just sufficient to charge the $V_{mid}$ node to $V_{in}$ and apply soft-switching to the switching mechanism $M_{top}$.

The controller 205 may be configured to operate the current control mechanism so that each operating cycle during which the capacitor $C_L$ is charged by $I_{Lbuck}$ ends with $I_{Lbuck}$ going slightly negative due to the inductor current ripple. When $I_{Lbuck}$ goes negative, $I_{Lbuck}$ flows to the upstream side of $L_{buck}$, driving node $V_{mid}$ high. $V_{mid}$ is pulled up and the switching mechanism $M_{top}$ turns on in zero-voltage switching mode when $V_{mid}$ is approximately equal to $V_{in}$, i.e., the voltage at the electric power source 208 (e.g., 12V). The switching mechanism $M_{top}$ may turn on in zero-current switching mode because $I_{Lbuck}$ should be near zero when $V_{mid}$ reaches $V_{in}$.

The inductor current ripple may be limited to value that is just sufficient to apply soft-switching by sensing a load current $I_{load}$ and capacitor current $I_{cap}$ when the switching mechanism $M_{top}$ is enabled and setting a time duration when the switching mechanism $M_{top}$ is on to achieve a negative inductor current $I_{Lbuck}$. Hence, the inductor current ripple varies in response to variations in the load current $I_{load}$.

The non-overlap time when both the switching mechanisms $M_{top}$ and $M_{bot}$ are off may be controlled by sensing the $V_{mid}$ node after turning off the switching mechanism $M_{top}$ or $M_{bot}$ and waiting until the $V_{mid}$ node goes to GND or $V_{in}$, respectively and then turning on the switching mechanism $M_{bot}$ or $M_{top}$, respectively. However, delays in the path through the controller 205 from sensing the $V_{mid}$ node to enabling the switching mechanisms $M_{top}$ and $M_{bot}$ may prevent the use of this technique. Instead, a calibration technique may be implemented to determine the non-overlap time during a first operating cycle (e.g., enabling and disabling each of the switching mechanisms $M_{top}$ and $M_{bot}$ once) and apply the non-overlap time during the next operating cycle.

As shown in FIG. 2A, the modified buck converter of the electric power conversion device 200 includes sense resistors $R_{C\_sense}$, and $R_{sense}$. $R_{C\_sense}$ is coupled in series with the capacitor $C_L$ and $R_{sense}$, is coupled in series with a load resistance $R_{load}$ (representing the load). $R_{sense}$ is used to measure the load current $I_{load}$. $R_{C\_sense}$ is used to sense the capacitor current $I_{cap}$ that corresponds to the inductor current ripple. In one embodiment, $L_{buck}$ is 330 nH, $C_L$ is 4.4.mF, and $R_{C\_sense}$ and $R_{sense}$ are each 0.5 mil. The voltages across $R_{C\_sense}$ and $R_{sense}$ are each amplified using an instrumentation amplifier and then digitized using ADC 220 and ADC 215, respectively. In one embodiment, the voltages across $R_{C\_sense}$ and $R_{sense}$, are digitized to a precision of at least 10 bits (i.e., 1 mV resolution). Controller 205 signals ADC 220 and ADC 215 to control sensing of the capacitor current $I_{cap}$ and the load current $I_{load}$, respectively.

The values of the load current $I_{load}$ and capacitor current $I_{cap}$ may be computed by the controller 205 based on the sensed voltages. The inductor current $I_{Lbuck}$ is the sum of the load current and the capacitor current.

$$I_{Lbuck}=I_{cap}+I_{load}$$

If the ripple peak-peak value of the inductor current $I_{Lbuck}$ is set to $2*(I_{load}+I_1)$ then, at the lowest point during steady state, the inductor current will go to $-I_1$. The capacitor current transitions between $-(I_{load}+I_1)$ and $(I_{load}+I_1)$. When the inductor current reaches and the capacitor current reaches $-(I_{load}+I_1)$, soft-switching may be applied to the switching mechanism $M_{top}$. $I_1$ is an amount by which the inductor current needs to go negative to enable soft-switching, and is referred to as an enabling current value.

A comparator 210 receives $V_{out}$ and $V_{ref}$ and indicates when $V_{out}$ is less than $V_{ref}$ for the controller 205 to turn off (i.e., disable) the switching mechanism $M_{bot}$. In one embodiment, the reference voltage $V_{ref}$ is set by a digital-to-analog converter (DAC) so the reference voltage can be trimmed to account for variations in power, voltage and temperature.

In one embodiment, the clock frequency at which the controller 205 operates is 105 MHz. The clock frequency of the controller 205 should be higher than the switching frequency of switching mechanisms $M_{top}$ and $M_{bot}$. The clock frequency of the controller 205 should be high enough to control the time durations when the switching mechanisms $M_{top}$ and $M_{bot}$ are enabled and high enough to control the non-overlap times for the switching mechanisms $M_{top}$ and $M_{bot}$. The controller 205 controls sampling of the capacitor current $I_{cap}$ and the load current $I_{load}$ based on the clock frequency.

Figure 2B:
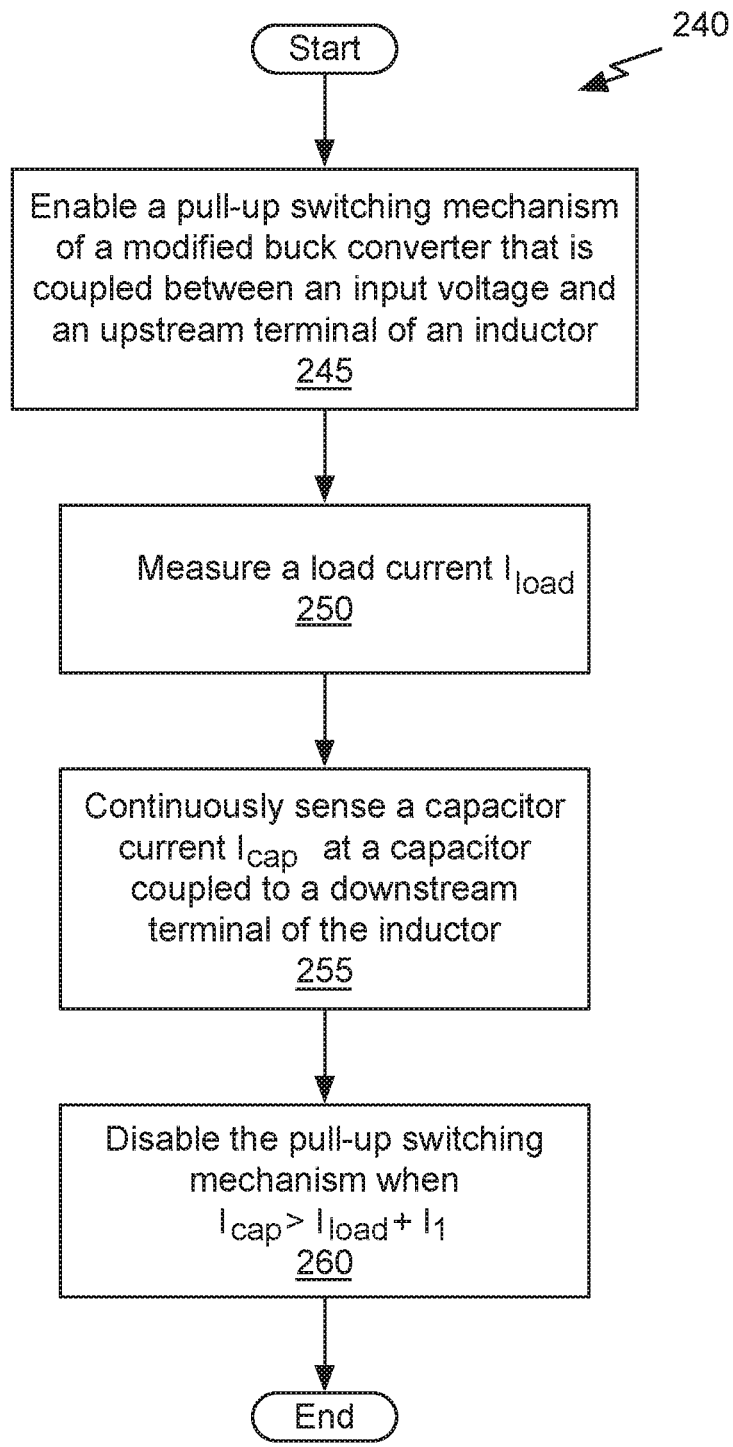
FIG. 2B illustrates a flowchart of a method for controlling the soft-switched modified buck converter shown in FIG. 2A, in accordance with one embodiment.

FIG. 2B illustrates a flowchart 240 of a method for controlling the soft-switched modified buck converter shown in FIG. 2A, in accordance with one embodiment. In one embodiment, the following method steps are performed by the electric power conversion device 200 of FIG. 2A. At step 245, the controller 205 enables (i.e., turns on) a pull-up switching mechanism (e.g., the switching mechanism $M_{top}$). As shown in FIG. 2A, the switching mechanism $M_{top}$ is coupled between $V_{in}$ and the upstream terminal of the inductor $L_{buck}$. At step 250, the controller 205 measures a load current $I_{load}$ at the time that the pull-up switching mechanism is enabled. In one embodiment, $I_{load}$ is measured by sampling a voltage across a sense resistor $R_{sense}$ that is coupled in series with the load resistance $R_{load}$.

At step 255, the controller 205 continuously senses a capacitor current $I_{cap}$ at the capacitor $C_L$ coupled to a downstream terminal of the inductor $L_{buck}$. In one embodiment, $I_{cap}$ is continuously sensed by sampling a voltage across a sense resistor $R_{C\_sense}$ that is coupled in series with the capacitor $C_L$. At step 260, the pull-up switching mechanism is disabled by the controller 205 when $I_{cap}>I_{load}+I_1$. In one embodiment, $-I_1$ is the amount of negative inductor current (i.e. current flowing from the downstream to the upstream terminal of $L_{buck}$) needed to enable the pull-up switching mechanism with zero volts across the source and drain terminals (i.e. in a soft-switching mode).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2C:
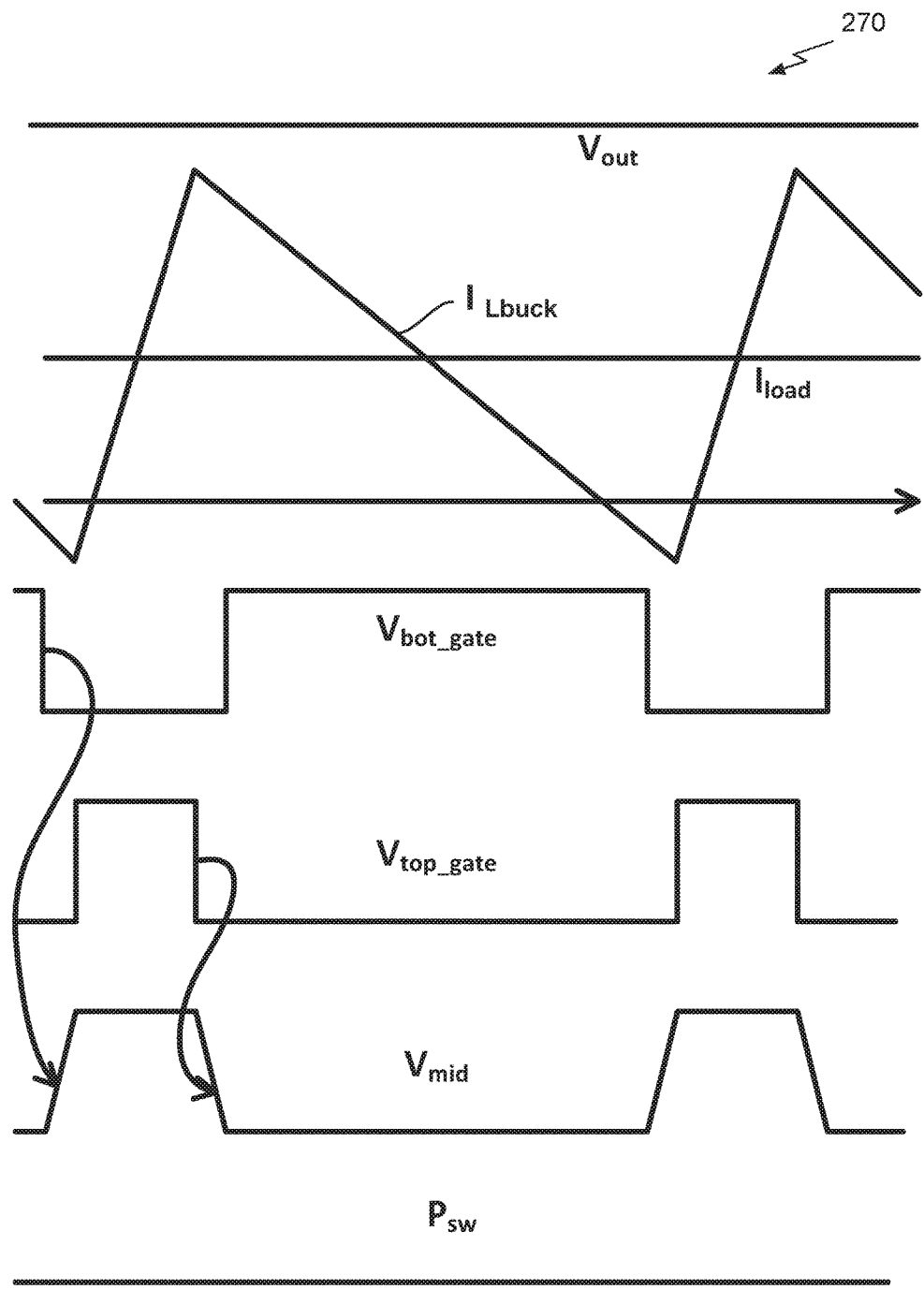
FIG. 2C illustrates voltage and current waveforms showing soft-switching of the switching devices within the modified buck converter shown in FIG. 2A, in accordance with one embodiment.

FIG. 2C illustrates voltage and current waveforms 270 showing soft-switching of the switching devices $M_{top}$ and $M_{bot}$ within the modified buck converter shown in FIG. 2A, in accordance with one embodiment. $I_{Lbuck}$ is used to swing $V_{mid}$ between the high supply voltage ($V_{in}$) and the low supply voltage (GND) to achieve zero voltage turn-on for each switching mechanism $M_{top}$ and $M_{bot}$. In contrast with the waveforms shown in FIG. 1B, $V_{mid}$ does not fall to a level below GND when $M_{bot}$ is disabled (i.e., when $V_{bot\_gate}$ transitions low). Therefore, the switching power $P_{sw}$ remains at zero compared with $P_{sw}$ spiking when the switching mechanism M2 is disabled as shown in FIG. 1B.

Timing of the turn-off events for the switching mechanisms $M_{top}$ and $M_{bot}$ is critical. If the switching mechanism $M_{bot}$ is disabled too early there may not be sufficient energy in $L_{buck}$ to pull the $V_{mid}$ to $V_{in}$ and enabling the switching mechanism $M_{top}$ will not occur in a zero voltage switching mode, causing a power loss. If disabling the switching mechanism $M_{bot}$ occurs too late, more current $I_{Lbuck}$ than is required will be in the inductor $L_{buck}$, leading to increased conduction losses. In contrast, timing of the enable events for the switching mechanisms $M_{top}$ and $M_{bot}$ is less critical. If either enable event is delayed by a small amount, the body diode of the switching mechanism $M_{top}$ or $M_{bot}$ that is being enabled will be forward biased for a short period of time, resulting in a very small conduction loss due to the voltage drop across the diode.

The controller 205 is configured to determine the enable and disable events for the switching mechanisms $M_{top}$ and $M_{bot}$. In particular, the controller 205 enables the switching mechanisms $M_{top}$ and $M_{bot}$ based on non-overlap time calibration counters that may be updated each operating cycle. The controller 205 disables the switching mechanism $M_{top}$ when $I_{cap}>I_{load}+I_1$. The controller 205 disables the switching mechanism $M_{bot}$ when $V_{out}<V_{ref}$. In one embodiment, the controller 205 is configured to control the switch transitions by using two coupled control loops. A first control loop controls the transitions of $V_{top\_gate}$ and $V_{bot\_gate}$ and a second control loop performs the calibration by continuously updating hi_NO_cnt and lo_NO_cnt.

Figure 3A:
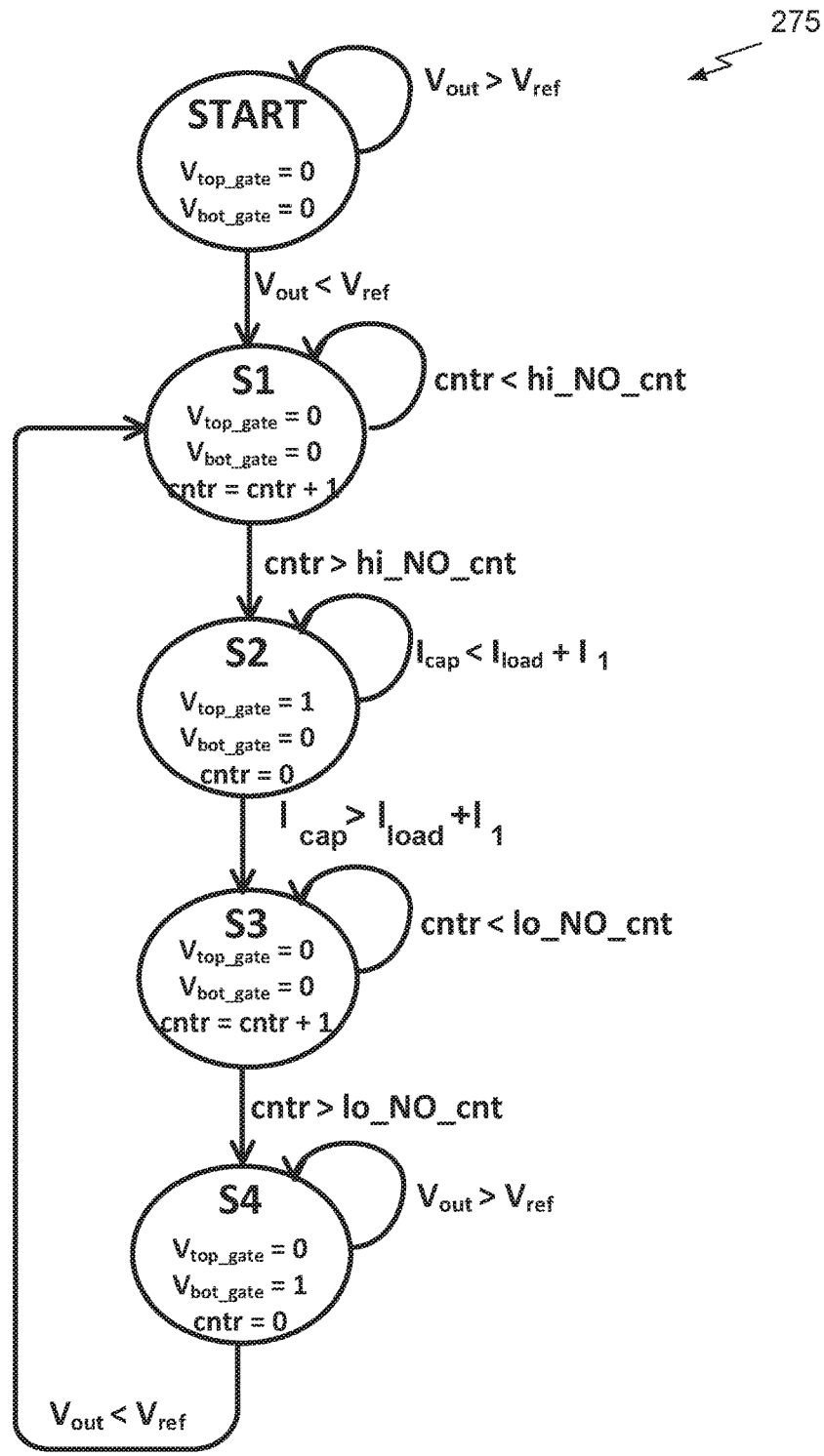
FIG. 3A illustrates a state diagram for controlling the soft-switched modified buck converter shown in FIG. 2A, in accordance with one embodiment.

FIG. 3A illustrates a state diagram 275 for controlling the soft-switched modified buck converter shown in FIG. 2A, in accordance with one embodiment. In a START state $V_{top\_gate}$ and $V_{bot\_gate}$ are both low, so the switching mechanisms $M_{top}$ and $M_{bot}$ are both off. The START state occurs at system startup. In one embodiment, before calibration, hi_NO_cnt and lo_NO_cnt are initialized to starting values at the START state. The starting values may be estimates determined by simulation. When $V_{out}<V_{ref}$ the controller 205 transitions from the START state to the S1 state. In the S1 state $V_{top\_gate}$ and $V_{bot\_gate}$ remain low, so the switching mechanisms $M_{top}$ and $M_{bot}$ both remain off. Each clock cycle of the controller 205, a counter (cntr) is incremented.

The counter is initialized to zero before the state S1 is entered. When cntr>hi_NO_cnt, the controller 205 transitions from the S1 state to the S2 state. In the state S1, $I_{Lbuck}$ is negative (flowing from the downstream terminal of $L_{buck}$ to the upstream terminal of $L_{buck}$) and $V_{mid}$ increases from GND to $V_{in}$. When the controller 205 transitions from the S1 state to the S2 state, the capacitor current $I_{cap}$ is at or close to $-(I_{load}+I_1)$ and the inductor current $I_{Lbuck}$ is at or close to $-I_1$ which ensures soft switching of the switching mechanism $M_{top}$.

The variable hi_NO_cnt controls the non-overlap time between $V_{bot\_gate}$ transitioning low (disabling the switching mechanism $M_{bot}$) and $V_{top\_gate}$ transitioning high (enabling the switching mechanism $M_{top}$). When cntr=hi_NO_cnt, $V_{mid}$ is approximately equal to $V_{in}$, so that zero voltage switching may be applied to the switching mechanism $M_{top}$. The variable hi_NO_cnt is a non-overlap time duration value that is initialized to a starting value and calibrated during operation of the electric power conversion device 200 by updating hi_NO_cnt each operating cycle based on $V_{mid}$ and $V_{top\_gate}$.

In the S2 state, $V_{top\_gate}$ is high and $V_{bot\_gate}$ remains low, so the switching mechanism $M_{top}$ is on and the switching mechanism $M_{bot}$ remains off. The counter (cntr) is cleared. By ensuring the capacitor current reaches $(I_{load}+I_1)$ at the end of the S2 state, the peak-to-peak inductor current ripple of $2*(I_{load}+I_1)$ is achieved in the steady state. When $I_{cap}>I_{load}+I_1$ the controller 205 transitions from the S2 state to the S3 state. In the S3 state $V_{top\_gate}$ and $V_{bot\_gate}$ are both low, so the switching mechanisms $M_{top}$ and $M_{bot}$ are both off.

When cntr>lo_NO_cnt, the controller 205 transitions from the S3 state to the S4 state. The variable lo_NO_cnt controls the non-overlap time between $V_{top\_gate}$ transitioning low (disabling the switching mechanism $M_{top}$) and $V_{bot\_gate}$ transitioning high (enabling the switching mechanism $M_{bot}$). When cntr=lo_NO_cnt, $V_{mid}$ is approximately equal to GND, so that zero voltage switching may be applied to the switching mechanism $M_{bot}$. The variable lo_NO_cnt is a non-overlap time duration value that is initialized to a starting value and calibrated during operation of the electric power conversion device 200 by updating lo_NO_cnt each operating cycle based on $V_{mid}$ and $V_{bot\_gate}$.

Figure 3B:
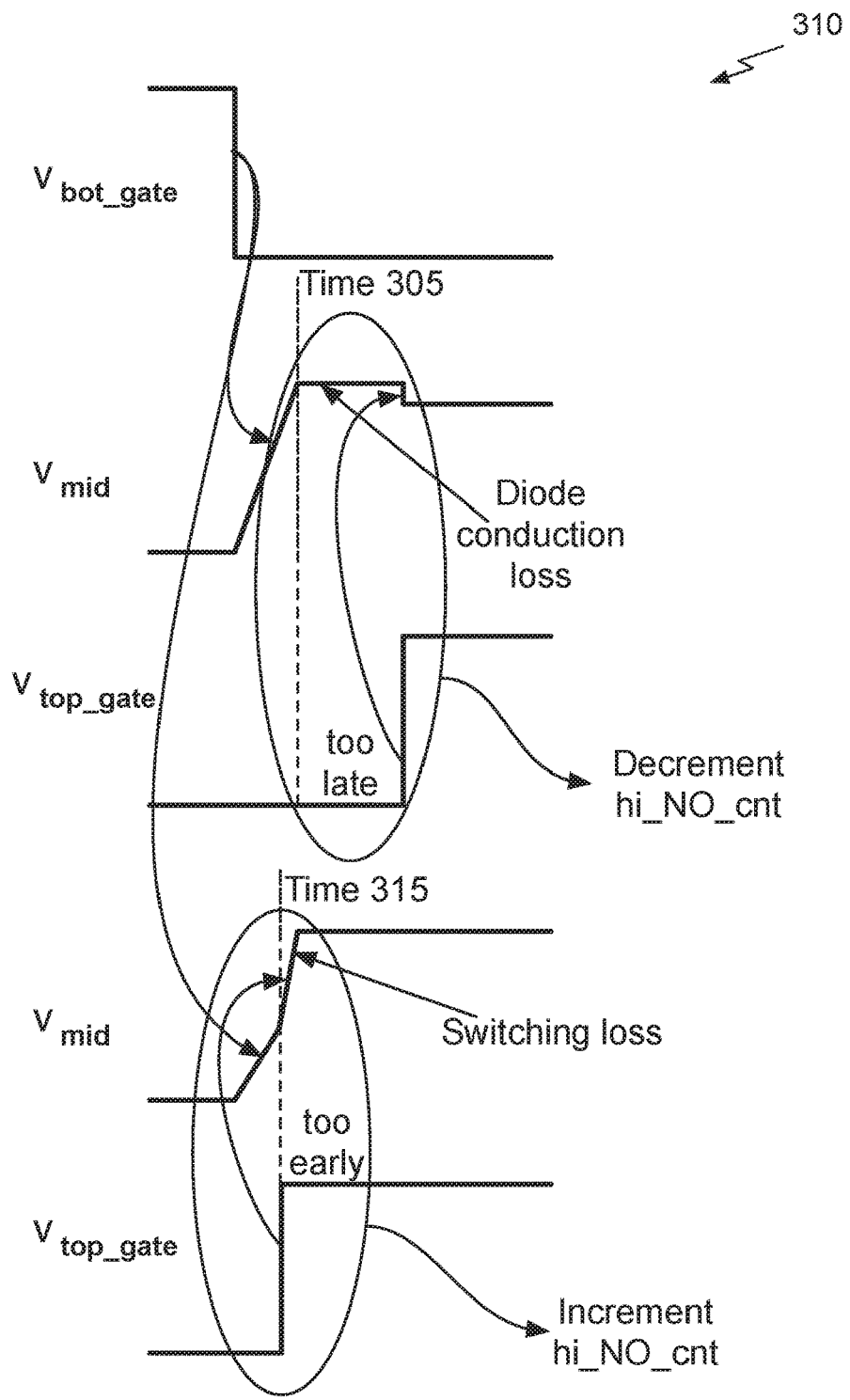
FIG. 3B illustrates voltage waveforms showing updating of the non-overlap time duration value hi_NO_cnt, in accordance with one embodiment.

FIG. 3B illustrates voltage waveforms 310 showing updating of the non-overlap time duration value hi_NO_cnt, in accordance with one embodiment. $V_{mid}$ begins to rise from GND to $V_{in}$ when $V_{bot\_gate}$ transitions from high to low. At time 305, $V_{mid}$ is higher than $V_{in}$ and $V_{top\_gate}$ is still low because cntr is less than hi_NO_cnt. Diode conduction losses occur when $V_{mid}$ is higher than $V_{in}$. The calibration technique adjusts the value of hi_NO_cnt so that $V_{top\_gate}$ will transition high when $V_{mid}$ reaches $V_{in}$. At time 305, $V_{top\_gate}$ is still low after $V_{mid}$ reaches $V_{in}$. Therefore, the value of hi_NO_cnt should be decreased.

In another example, at time 315, $V_{mid}$ has not reached $V_{in}$ and $V_{top\_gate}$ has already transitioned high because cntr is greater than hi_NO_cnt. Switching losses occur when $V_{top\_gate}$ is asserted before $V_{mid}$ reaches $V_{in}$. The calibration technique adjusts hi_NO_cnt by increasing the value of hi_NO_cnt so that $V_{top\_gate}$ will transition high when $V_{mid}$ reaches $V_{in}$. The updated non-overlap time duration value hi_NO_cnt will be used by the controller 205 for the next operating cycle.

In one embodiment, bootstrapping facilitates $V_{top\_gate}$ rising to a value greater than the supply voltage $V_{in}$ so that switching mechanism $M_{top}$ is fully turned on. More specifically, to fully turn on, $V_{top\_gate}$ rises to at least a threshold voltage above $V_{mid}$ when $V_{mid}$ has risen to equal V. In a bootstrapped embodiment, the variable hi_NO_cnt is updated each operating cycle based on $V_{mid}$, $V_{top\_gate}$, and $V_{top\_gate\_2Vin}$. The second signal $V_{top\_gate\_2Vin}$ is used to determine when $V_{top\_gate}$ has gone high by rising over $V_{in}$. Even with bootstrapping, rising of $V_{mid}$ and $V_{top\_gate}$ may not be aligned (i.e., $V_{mid}$ may rise before $V_{top\_gate}$ or $V_{top\_gate}$ may rise before $V_{mid}$). Therefore, hi_NO_cnt is updated each operating cycle to align $V_{top\_gate}$ and $V_{mid}$.

Figure 3C:
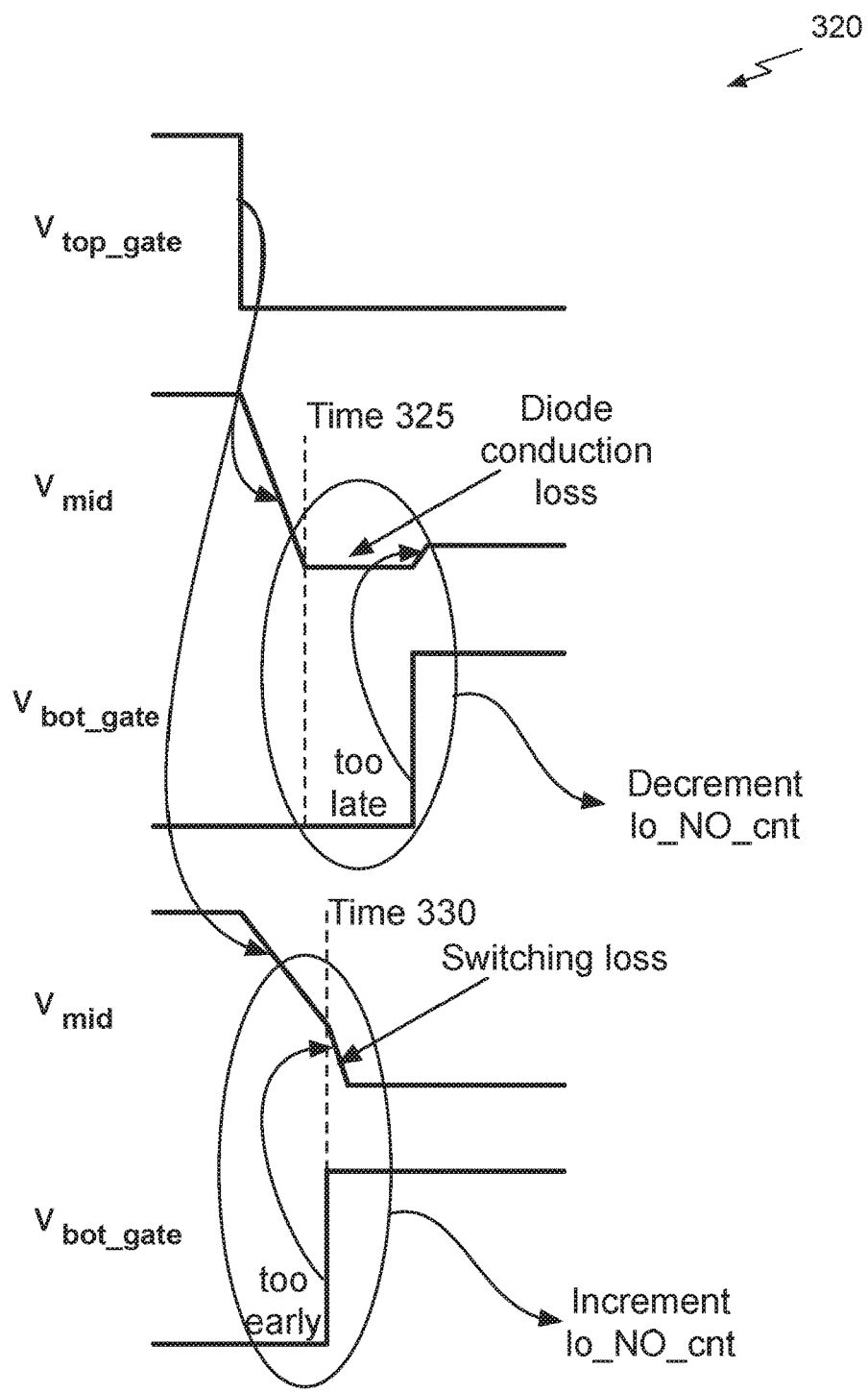
FIG. 3C illustrates voltage waveforms showing updating of the non-overlap time duration value lo_NO_cnt, in accordance with one embodiment.

FIG. 3C illustrates voltage waveforms 320 showing updating of the non-overlap time duration value lo_NO_cnt, in accordance with one embodiment. $V_{mid}$ begins to drop from $V_{in}$ to GND when $V_{top\_gate}$ transitions from high to low. At time 325, $V_{mid}$ is at GND and $V_{bot\_gate}$ is still low because cntr is less than lo_NO_cnt and diode conduction loss occurs. The calibration technique adjusts the value of lo_NO_cnt so that $V_{bot\_gate}$ will transition high when $V_{mid}$ reaches GND. At time 325, $V_{bot\_gate}$ is still low after $V_{mid}$ reaches GND. Therefore, the value of lo_NO_cnt should be decreased.

In another example, at time 330, $V_{mid}$ has not reached GND and $V_{bot\_gate}$ has already transitioned high because cntr is greater than lo_NO_cnt. Switching losses occur when $V_{bot\_gate}$ is asserted before $V_{mid}$ reaches GND. The calibration technique adjusts lo_NO_cnt by increasing the value of lo_NO_cnt so that $V_{bot\_gate}$ will transition high when $V_{mid}$ reaches GND. The updated non-overlap time duration value lo_NO_cnt will be used by the controller 205 for the next operating cycle.

Figure 3D:
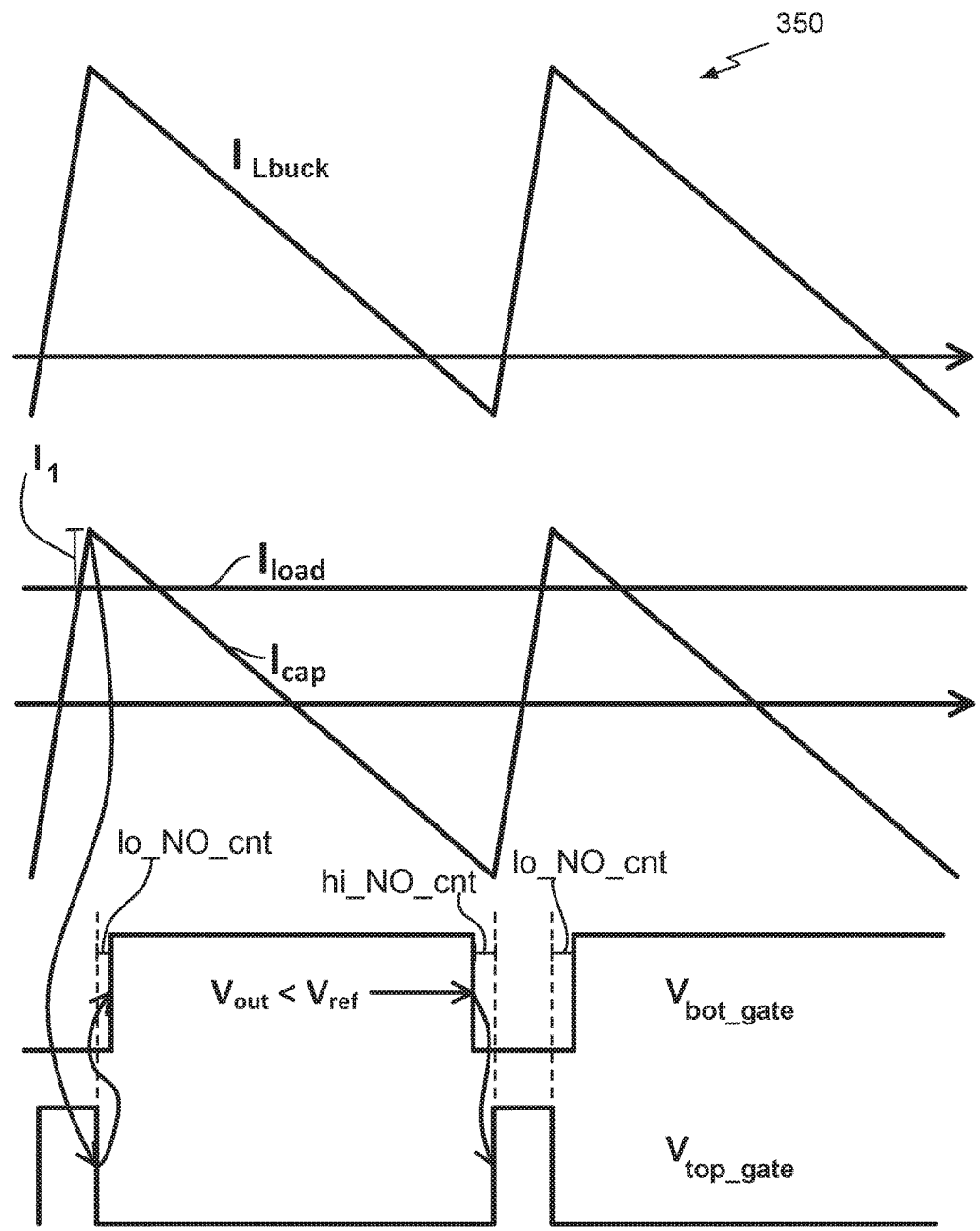
FIG. 3D illustrates voltage and current waveforms showing soft-switching of the switching devices within the modified buck converter shown in FIG. 2A, in accordance with one embodiment.

FIG. 3D illustrates voltage and current waveforms 350 showing soft-switching of the switching devices within the modified buck converter shown in FIG. 2A, in accordance with one embodiment. As shown in the current waveforms 350, $I_{Lbuck}=I_{cap}+I_{load}$. When $I_{cap}>I_{load}+I_1$ the controller 205 negates $V_{top\_gate}$ to turn off the switching mechanism $M_{top}$. $V_{top\_gate}$ and $V_{bot\_gate}$ both remain low until cntr=lo_NO_cnt when the controller 205 asserts $V_{bot\_gate}$ to turn on the switching mechanism $M_{bot}$. The controller 205 continues to assert $V_{bot\_gate}$ until $V_{out}<V_{ref}$ when the controller 205 negates $V_{bot\_gate}$. $V_{top\_gate}$ and $V_{bot\_gate}$ both remain low until cntr=hi_NO_cnt when the controller 205 asserts $V_{top\_gate}$ to turn on the switching mechanism $M_{top}$).

An alternative technique for controlling the switching mechanisms controls $I_1$ based on the load current $I_{load}$. In one embodiment, a look-up table is used to approximately set $I_1$ and the non-overlap times when $V_{top\_gate}$ and $V_{bot\_gate}$ both remain negated to achieve soft switching of the switching mechanisms $M_{top}$ and $M_{bot}$.

Figure 4A:
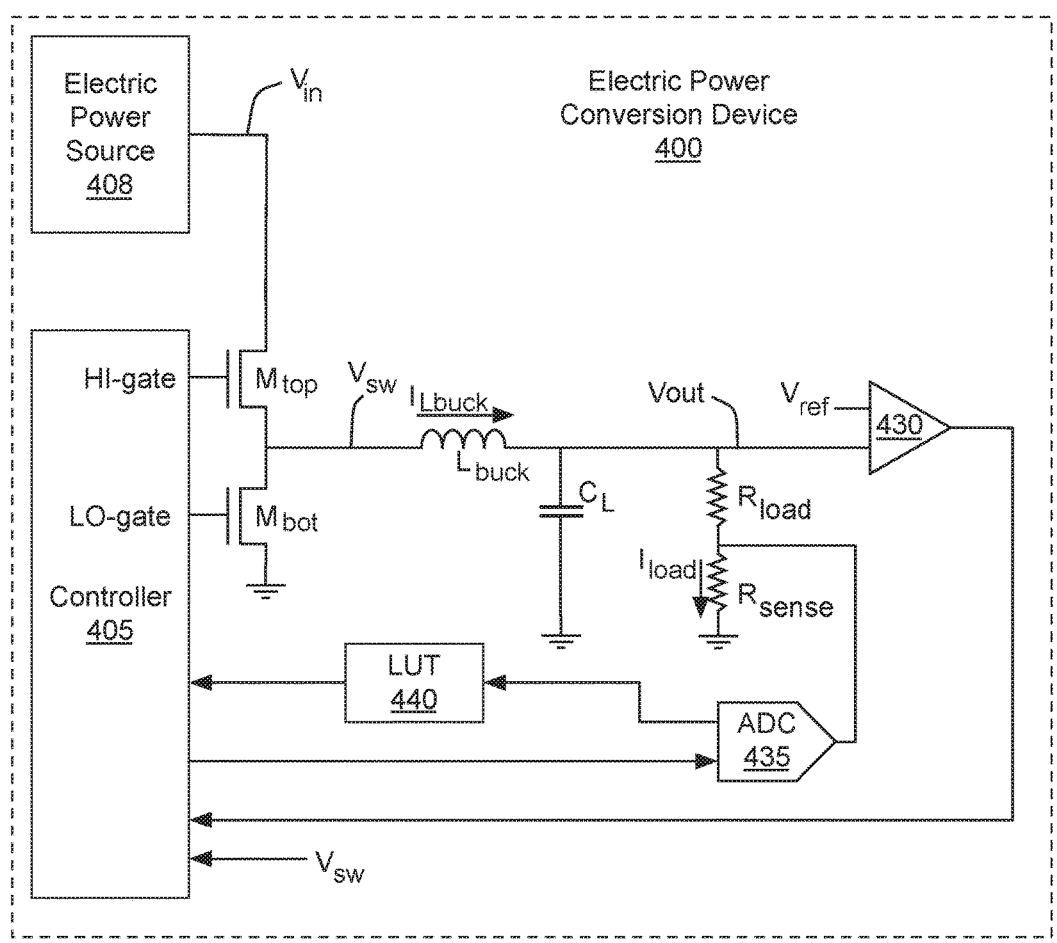
FIG. 4A illustrates another electric power conversion device that is implemented as a modified buck converter including a look-up table, in accordance with one embodiment.

FIG. 4A illustrates another electric power conversion device 400 that is implemented as a modified buck converter including a look-up table, in accordance with one embodiment. A controller 405 is operable to control the current $I_{Lbuck}$ flowing through the inductor $L_{buck}$. The arrow indicates the flow of current $I_{Lbuck}$ in the positive direction from an upstream end of the inductor $L_{buck}$ to a downstream end of the inductor $L_{buck}$. The controller 405 is configured to apply one or more control signals to the switching mechanisms $M_{top}$ and $M_{bot}$. As shown in FIG. 4A, a control signal HI-gate is applied to the switching mechanism $M_{top}$ and a control signal LO-gate is applied to the switching mechanism $M_{bot}$.

The controller 405 may be configured to generate pulse width modulation (PWM) signals or pulse frequency modulation (PFM) signals, a combination of PWM and PFM, and/or different control signals to selectively enable the switching mechanisms $M_{top}$ and $M_{bot}$ according to a duty factor. In one embodiment, the controller 405 is configured to generate control signals to selectively enable the switching mechanisms $M_{top}$ and $M_{bot}$ to perform soft-switching. Regardless of the specific configuration, the controller 405 is configured to provide control signals such that the switching mechanisms $M_{top}$ and $M_{bot}$ are not concurrently enabled. In other words, only one of switching mechanism $M_{top}$ and $M_{bot}$ is enabled at a time. Enabling switching mechanisms $M_{top}$ and $M_{bot}$ concurrently provides a direct path between the supply of electric power source 408 and ground, thereby potentially damaging the electric power conversion device 400 and/or a load at $V_{out}$ and/or resulting in undesirable high power usage.

To apply soft-switching when the switching mechanism $M_{top}$ is enabled, the pulses turning on the switching mechanisms $M_{top}$ and $M_{bot}$ should control the non-overlap time when both switching mechanisms $M_{top}$ and $M_{bot}$ are off to produce the amount of inductor current $I_{Lbuck}$ needed to charge the $V_{sw}$ node to $V_{in}$. Power losses may be minimized by limiting the inductor current ripple to a value that is just sufficient to charge the $V_{sw}$ node to $V_{in}$ and apply soft-switching to the switching mechanism $M_{top}$.

The controller 405 may be configured to operate the current control mechanism so that each operating cycle during which the capacitor $C_L$ is charged by $I_{Lbuck}$ ends with $I_{Lbuck}$ going slightly negative due to the inductor current ripple. When $I_{Lbuck}$ goes negative, $I_{Lbuck}$ flows to the upstream side of $L_{buck}$, driving node $V_{sw}$ high. $V_{sw}$ is pulled up and the switching mechanism $M_{top}$ turns on in zero-voltage switching mode when $V_{mid}$ is approximately equal to $V_{in}$, i.e., the voltage at the electric power source 208 (e.g., 12V). The switching mechanism $M_{top}$ may turn on in zero-current switching mode because $I_{Lbuck}$ should be near zero when $V_{sw}$ reaches $V_{in}$.

The inductor current ripple may be limited to a value that is just sufficient to apply soft-switching by sensing a load current $I_{load}$ when the switching mechanism n" is enabled and setting a time duration when the switching mechanism $M_{top}$ is on to achieve a negative inductor current $I_{Lbuck}$. Hence, the inductor current ripple varies in response to variations in the load current $I_{load}$. Compared with the electric power conversion device 200, $R_{C\_sense}$ and ADC 220 are omitted because the capacitor current is not sensed in the electric power conversion device 400.

$R_{sense}$ is coupled in series with a load resistance $R_{load}$ (representing the load) to measure the load current $I_{load}$. The voltage across $R_{sense}$ is amplified using an instrumentation amplifier and then digitized using ADC 435. In one embodiment, the voltage across $R_{sense}$ is digitized to a precision of at least 10 bits (i.e., 1 mV resolution). The digitized voltage representing the value of the load current $I_{load}$ may be input to a look-up table (LUT) 440 to obtain a duration for which the switching mechanism $M_{top}$ is enabled by asserting the HI-gate signal.

A comparator 430 receives $V_{out}$ and $V_{ref}$ and indicates when $V_{out}$ is less than $V_{ref}$ for the controller 405 to disable (i.e., turn off) the switching mechanism $M_{bot}$. In one embodiment, the reference voltage $V_{ref}$ is set by a digital-to-analog converter (DAC) so the reference voltage can be trimmed to account for variations in power, voltage and temperature.

The amount of current ripple, $I_{ripple}$ that is required for current in the inductor $L_{buck}$ to change direction when the load current is $I_{load}$ is $2*I_{load}$. Further some additional negative current ($I_1$) is required to charge the capacitance at the $V_{sw}$ node from GND to $V_{in}$. So the peak-to-peak inductor current ripple is $I_{ripple}=(2*I_{load}+2*I_1)$. $I_{ripple}$ can be used to calculate the time duration for which the switching mechanism $M_{top}$ is required to stay on:

$$t_{on} = L_{buck} * \frac{2*I_{load} + 2*I_1}{V_{in} - V_{out}}$$

The $t_{on}$ values are programmed into the LUT 440 and a specific value is read based on the sensed load current $I_{load}$. The resolution at which the load current $I_{load}$ is measured impacts the accuracy of $I_{Lripple}$ and the efficiency of the electric power conversion device 400. When less resolution is used to measure $I_{load}$, the current inductor current ripple may be greater than what is required to apply soft switching.

The controller 405 may be configured to use fixed non-overlap times for lo_NO_cnt and hi_NO_cnt that are based on accurate simulations. However, any mismatch between the simulation and implementation may result in non-optimum non-overlap times that may increase losses. Alternatively, non-overlap times for lo_NO_cnt and hi_NO_cnt corresponding to different values of $I_{load}$ may be stored in the LUT 440 and read along with $t_{on}$. In another embodiment, the calibration technique may be implemented to update the non-overlap time duration values lo_NO_cnt and hi_NO_cnt during a first operating cycle and apply, by the controller 405, the updated non-overlap time duration values lo_NO_cnt and hi_NO_cnt during the next operating cycle.

Figure 4B:
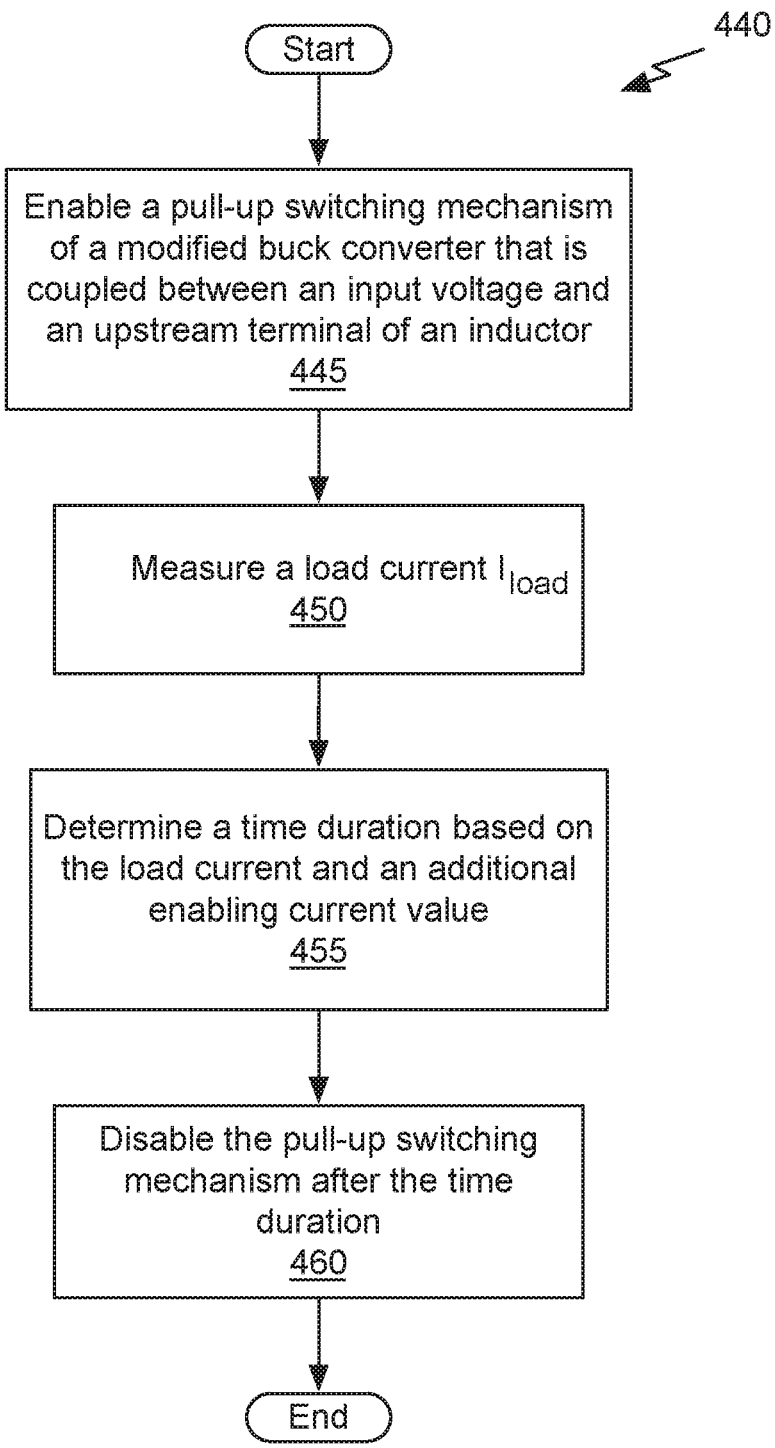
FIG. 4B illustrates a flowchart of a method for controlling the soft-switched modified buck converter shown in FIG. 4A, in accordance with one embodiment.

FIG. 4B illustrates a flowchart of a method for controlling the soft-switched modified buck converter shown in FIG. 4A, in accordance with one embodiment. In one embodiment, the following method steps are performed by the electric power conversion device 400 of FIG. 4A. At step 445, the controller 405 enables (i.e., turns on) a pull-up switching mechanism (e.g., the switching mechanism $M_{top}$). As shown in FIG. 4A, the switching mechanism $M_{top}$ is coupled between $V_{in}$ and the upstream terminal of the inductor $L_{buck}$. At step 450, the controller 405 measures a load current $I_{load}$ at the time that the pull-up switching mechanism is enabled. In one embodiment, $I_{load}$ is measured by sampling a voltage across a sense resistor $R_{sense}$ that is coupled in series with the load resistance $R_{load}$.

At step 455, the controller 405 determines a time duration based on the load current Load and an additional enabling current value $I_1$. In one embodiment, the time duration is $t_{on}$ and is computed as previously described. In one embodiment, the time duration is determined by reading a value of $t_{on}$ from the LUT 440 based on $I_{load}$. At step 460, the pull-up switching mechanism is disabled by the controller 405 at the end of the time duration.

Figure 4C:
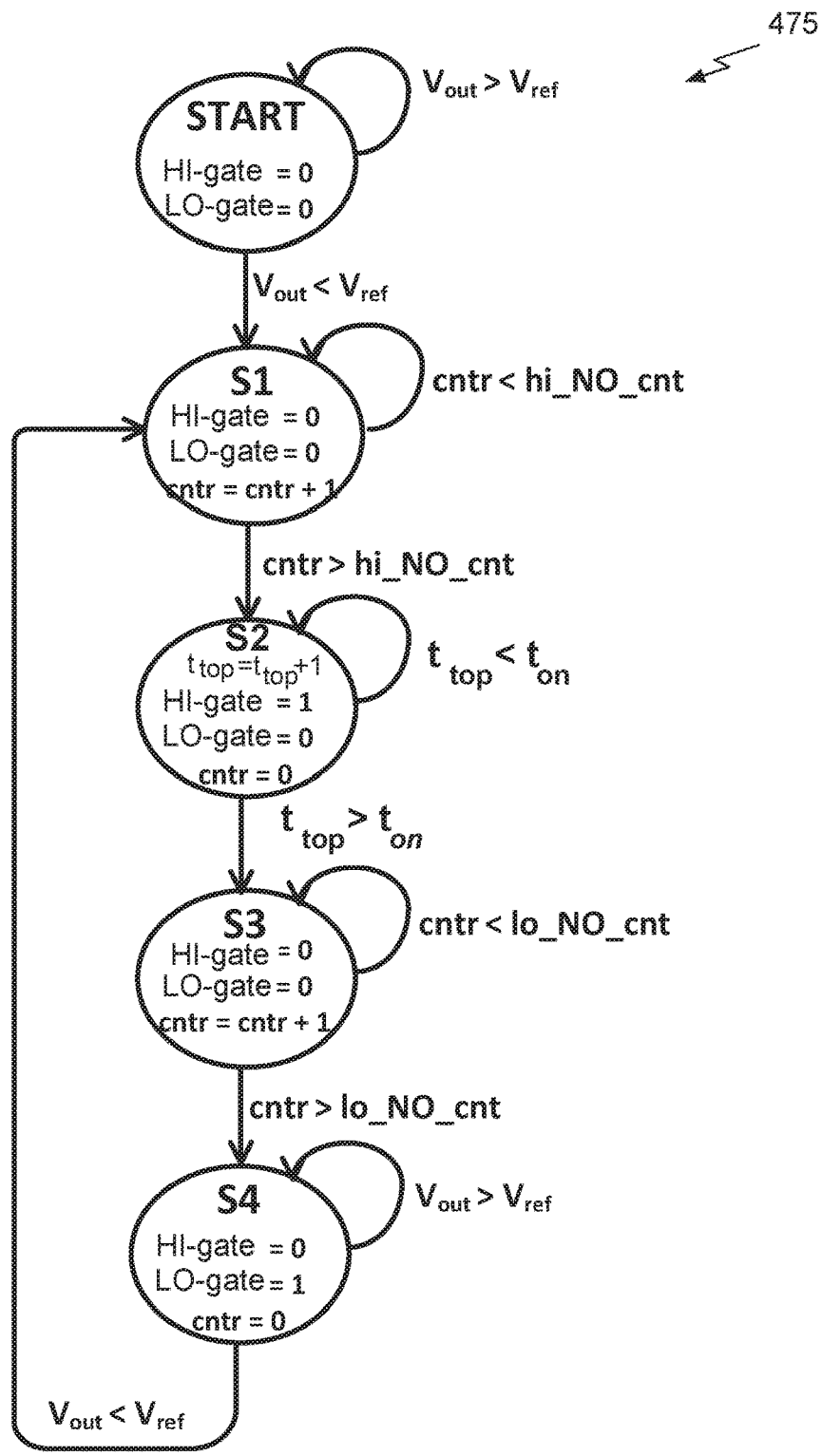
FIG. 4C illustrates a state diagram for controlling the soft-switched modified buck converter shown in FIG. 4A, in accordance with one embodiment.

FIG. 4C illustrates a state diagram 475 for controlling the soft-switched modified buck converter shown in FIG. 4A, in accordance with one embodiment. In a START state HI-gate and LO-gate are both low, so the switching mechanisms $M_{top}$ and $M_{bot}$ are both off. When $V_{out}<V_{ref}$, the controller 405 transitions from the START state to the S1 state. In the S1 state HI-gate and LO-gate remain low, so the switching mechanisms $M_{top}$ and $M_{bot}$ both remain off. Each clock cycle, a counter (cntr) is incremented.

The counter is initialized to zero before the state S1 is entered. When cntr>hi_NO_cnt, the controller 405 transitions from the S1 state to the S2 state. In the state S1, $I_{Lbuck}$ is negative (flowing from the downstream terminal of $L_{buck}$ to the upstream terminal of $L_{buck}$) and $V_{sw}$ increases from GND to $V_{in}$. The variable hi_NO_cnt controls the non-overlap time between LO-gate transitioning low (disabling the switching mechanism $M_{bot}$) and HI-gate transitioning high (enabling the switching mechanism $M_{top}$). When cntr=hi_NO_cnt, $V_{sw}$ is approximately equal to $V_{in}$, so that zero voltage switching may be applied to the switching mechanism $M_{top}$. In one embodiment, the variable hi_NO_cnt is a non-overlap time duration value that is initialized to a starting value and updated each operating cycle. In another embodiment, the variable hi_NO_cnt is a fixed value or varies with $I_{load}$ and is stored in the LUT 440.

In the S2 state HI-gate is high and LO-gate remains low, so the switching mechanism $M_{top}$ is on and the switching mechanism $M_{bot}$ remains off. The counter (cntr) is cleared. A timer $t_{top}$ is cleared before the S2 state is entered and increments each clock cycle. When $t_{top}>t_{on}$ the controller 205 transitions from the S2 state to the S3 state. In the S3 state HI-gate and LO-gate are both low, so the switching mechanisms $M_{top}$ and $M_{bot}$ are both off.

When cntr>lo_NO_cnt, the controller 205 transitions from the S3 state to the S4 state. The variable lo_NO_cnt controls the non-overlap time between HI-gate transitioning low (disabling the switching mechanism $M_{top}$) to LO-gate transitioning high (enabling the switching mechanism $M_{bot}$). When cntr=lo_NO_cnt, $V_{sw}$ is approximately equal to GND, so that zero voltage switching may be applied to the switching mechanism $M_{bot}$. The variable lo_NO_cnt is a non-overlap time duration value that is initialized to a starting value and updated each operating cycle based on $V_{sw}$ and LO-gate.

Figure 5:
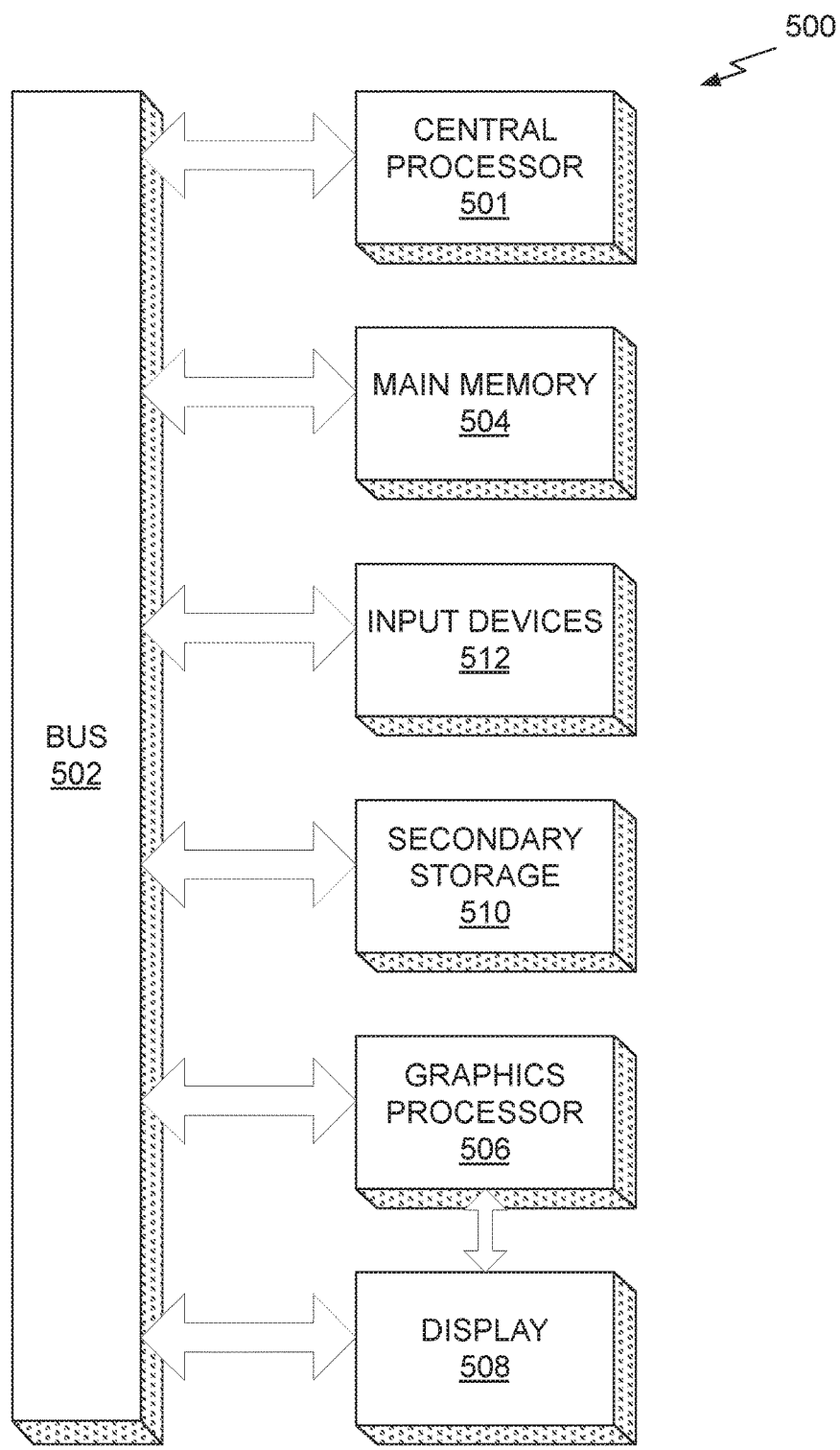
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one central processor 501 that is connected to a communication bus 502. The communication bus 502 may be implemented using any suitable protocol, such as PCI (Peripheral Component Interconnect), PCI-Express, AGP (Accelerated Graphics Port), HyperTransport, or any other bus or point-to-point communication protocol(s). The system 500 also includes a main memory 504. Control logic (software) and data are stored in the main memory 504 which may take the form of random access memory (RAM).

The system 500 also includes input devices 512, a graphics processor 506, and a display 508, i.e. a conventional CRT (cathode ray tube), LCD (liquid crystal display), LED (light emitting diode), plasma display or the like. User input may be received from the input devices 512, e.g., keyboard, mouse, touchpad, microphone, and the like. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. One or more of the electric power conversion devices 200 and 400 shown in FIGS. 2A and 4A, respectively, may be incorporated in the system 500 to provide power to one or more of the chips.

The system 500 may also include a secondary storage 510. The secondary storage 510 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 504 and/or the secondary storage 510. Such computer programs, when executed, enable the system 500 to perform various functions. The main memory 504, the storage 510, and/or any other storage are possible examples of computer-readable media.

In one embodiment, the architecture and/or functionality of the various previous figures may be implemented in the context of the central processor 501, the graphics processor 506, an integrated circuit (not shown) that is capable of at least a portion of the capabilities of both the central processor 501 and the graphics processor 506, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, laptop computer, server, workstation, game consoles, embedded system, and/or any other type of logic. Still yet, the system 500 may take the form of various other devices including, but not limited to a personal digital assistant (PDA) device, a mobile phone device, a television, etc.

Further, while not shown, the system 500 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   enabling a pull-up switching mechanism that is coupled to an upstream terminal of an inductor within a modified buck converter circuit;
   measuring a load current at the output of the modified buck regulator circuit;
   continuously sensing a capacitor current associated with a capacitor that is coupled to a downstream terminal of the inductor; and
   disabling the pull-up switching mechanism when the capacitor current is greater than a sum of the load current and an enabling current value, wherein the enabling current value is an amount of current flowing from the downstream terminal of the inductor to the upstream terminal of the inductor needed to enable the pull-up switching mechanism in a soft-switching mode.

2. A modified buck regulator circuit, comprising:
   a pull-up switching mechanism;
   a pull-down switching mechanism that is coupled to the pull-up switching mechanism;

an inductor having an upstream terminal that is coupled between the pull-up switching mechanism and the pull-down switching mechanism;
a capacitor that is coupled to a downstream terminal of the inductor and in parallel with the pull-down switching mechanism; and
a controller circuit that is coupled to the pull-up switching mechanism and the pull-down switching mechanism and configured to:
enable the pull-up switching mechanism;
measure a load current at an output of the modified buck regulator circuit;
continuously sense a capacitor current at the capacitor; and
disable the pull-up switching mechanism when the capacitor current is greater than a sum of the load current and an enabling current value, wherein the enabling current value is an amount of current flowing from the downstream terminal of the inductor to the upstream terminal of the inductor needed to enable the pull-up switching mechanism in a soft-switching mode.

3. The modified buck regulator circuit of claim 2, wherein the controller is further configured to, prior to enabling the pull-up switching mechanism:
disable the pull-down switching mechanism; and
wait a non-overlap time duration before enabling the pull-up switching mechanism.

4. The modified buck regulator circuit of claim 3, wherein the non-overlap time duration is calibrated during a previous operating cycle of the modified buck regulator circuit.

5. The modified buck regulator circuit of claim 2, wherein the controller is further configured to disable the pull-down switching mechanism when the output voltage is less than a reference voltage.

6. The modified buck regulator circuit of claim 2, wherein a peak-to-peak ripple of current through the inductor is twice the sum of the load current and the enabling current value.

7. A modified buck regulator circuit, comprising:
a pull-up switching mechanism;
a pull-down switching mechanism that is coupled to the pull-up switching mechanism;
an inductor having an upstream terminal that is coupled between the pull-up switching mechanism and the pull-down switching mechanism;
a capacitor that is coupled to a downstream terminal of the inductor and in parallel with the pull-down switching mechanism; and
a controller circuit that is coupled to the pull-up switching mechanism and the pull-down switching mechanism and configured to:
enable the pull-up switching mechanism;
measure a load current at an output of the modified buck regulator circuit;
continuously sense a capacitor current at the capacitor;
disable the pull-up switching mechanism when the capacitor current is greater than a sum of the load current and an enabling current value; and
after disabling the pull-up switching mechanism, wait a non-overlap time duration to enable the pull-down switching mechanism, wherein the non-overlap time duration is calibrated during a previous operating cycle of the modified buck regulator circuit by decreasing the non-overlap time duration when a voltage at the upstream terminal falls below a low supply voltage before the pull-down switching mechanism is enabled.

8. A modified buck regulator circuit, comprising:
a pull-up switching mechanism;
a pull-down switching mechanism that is coupled to the pull-up switching mechanism;
an inductor having an upstream terminal that is coupled between the pull-up switching mechanism and the pull-down switching mechanism;
a capacitor that is coupled to a downstream terminal of the inductor and in parallel with the pull-down switching mechanism; and
a controller circuit that is coupled to the pull-up switching mechanism and the pull-down switching mechanism and configured to:
enable the pull-up switching mechanism;
measure a load current at an output of the modified buck regulator circuit;
continuously sense a capacitor current at the capacitor;
disable the pull-up switching mechanism when the capacitor current is greater than a sum of the load current and an enabling current value; and
after disabling the pull-up switching mechanism, wait a non-overlap time duration to enable the pull-down switching mechanism, wherein the non-overlap time duration is calibrated during a previous operating cycle of the modified buck regulator circuit by increasing the non-overlap time duration when the pull-down switching mechanism is enabled before a voltage at the upstream terminal falls below a low supply voltage.

9. A modified buck regulator circuit, comprising:
a pull-up switching mechanism;
a pull-down switching mechanism that is coupled to the pull-up switching mechanism;
an inductor having an upstream terminal that is coupled between the pull-up switching mechanism and the pull-down switching mechanism;
a capacitor that is coupled to a downstream terminal of the inductor and in parallel with the pull-down switching mechanism; and
a controller circuit that is coupled to the pull-up switching mechanism and the pull-down switching mechanism and configured to:
enable the pull-up switching mechanism;
measure a load current at an output of the modified buck regulator circuit;
continuously sense a capacitor current at the capacitor;
disable the pull-up switching mechanism when the capacitor current is greater than a sum of the load current and an enabling current value; and
prior to enabling the pull-up switching mechanism:
disable the pull-down switching mechanism; and
wait a non-overlap time duration before enabling the pull-up switching mechanism, wherein the non-overlap time duration is calibrated during a previous operating cycle of the modified buck regulator circuit by increasing the non-overlap time duration when the pull-up switching mechanism is enabled before a voltage at the upstream terminal rises to a high supply voltage.

10. A modified buck regulator circuit, comprising:
a pull-up switching mechanism;
a pull-down switching mechanism that is coupled to the pull-up switching mechanism;
an inductor having an upstream terminal that is coupled between the pull-up switching mechanism and the pull-down switching mechanism;

a capacitor that is coupled to a downstream terminal of the inductor and in parallel with the pull-down switching mechanism; and a controller circuit that is coupled to the pull-up switching mechanism and the pull-down switching mechanism and configured to:

enable the pull-up switching mechanism;

measure a load current at an output of the modified buck regulator circuit;

continuously sense a capacitor current at the capacitor;

disable the pull-up switching mechanism when the capacitor current is greater than a sum of the load current and an enabling current value; and prior to enabling the pull-up switching mechanism:
disable the pull-down switching mechanism; and
wait a non-overlap time duration before enabling the pull-up switching mechanism, wherein the non-overlap time duration is calibrated during a previous operating cycle of the modified buck regulator circuit by decreasing the non-overlap time duration when a voltage at the upstream terminal rises to a high supply voltage before the pull-up switching mechanism is enabled.

* * * * *

UNITED STATES PATENT AND TRADEMARK OFFICE
CERTIFICATE OF CORRECTION

| | | |
|---|---|---|
| PATENT NO. | : 10,224,813 B2 | Page 1 of 1 |
| APPLICATION NO. | : 15/080461 | |
| DATED | : March 5, 2019 | |
| INVENTOR(S) | : Kudva et al. | |

It is certified that error appears in the above-identified patent and that said Letters Patent is hereby corrected as shown below:

In the Specification

Column 1 Line 15 insert:
-- STATEMENT REGARDING FEDERALLY SPONSORED RESEARCH AND DEVELOPMENT
This invention was made with US Government support under LLNS subcontract B609487 awarded by DOE. The US Government has certain rights in this invention. --

Signed and Sealed this
Twenty-first Day of July, 2020

Andrei Iancu
*Director of the United States Patent and Trademark Office*